(12) United States Patent
Li et al.

(10) Patent No.: US 11,945,967 B2
(45) Date of Patent: Apr. 2, 2024

(54) DIRT PICK UP RESISTANT LATEX RESIN

(71) Applicant: BEHR PROCESS CORPORATION, Santa Ana, CA (US)

(72) Inventors: Jigui Li, Irvine, CA (US); Christopher Ziehm, Costa Mesa, CA (US); Ryan Hicken, Tustin, CA (US)

(73) Assignee: Behr Process Corporation, Santa Ana, CA (US)

( * ) Notice: Subject to any disclaimer, the term of this patent is extended or adjusted under 35 U.S.C. 154(b) by 3 days.

(21) Appl. No.: 16/919,686

(22) Filed: Jul. 2, 2020

(65) Prior Publication Data

US 2022/0002558 A1 Jan. 6, 2022

(51) Int. Cl.
*C08F 220/14* (2006.01)
*C08F 2/44* (2006.01)
(Continued)

(52) U.S. Cl.
CPC .............. *C09D 5/00* (2013.01); *C08F 220/14* (2013.01); *C08F 220/1804* (2020.02);
(Continued)

(58) Field of Classification Search
CPC ...... C08F 220/343; C08F 220/14; C08F 2/44; C09D 133/08; C09D 133/12; C09D 33/14; C09D 5/00
(Continued)

(56) References Cited

U.S. PATENT DOCUMENTS 5,439,970 A 8/1995 Reeb
8,722,756 B2 5/2014 Balk et al.
(Continued)

FOREIGN PATENT DOCUMENTS

CN 111333772 A 6/2020
EP 1574555 B1 4/2007
(Continued)

OTHER PUBLICATIONS

Int'l Search Report and Written Opinion dated Nov. 12, 2021 for PCT Appn. No. PCT/US2021/040274, 14 pgs.
(Continued)

*Primary Examiner* — Kelechi C Egwim
(74) *Attorney, Agent, or Firm* — Brooks Kushman P.C.

(57) ABSTRACT

A method for forming a benzophenone-containing emulsion is provided. The method includes a step of forming a pre-emulsion by combining a monomer composition with a benzophenone or a benzophenone derivative in water, the monomer composition including one or more monomers selected from the group consisting of (meth)acrylic acid monomers and (meth)acrylic monomers, vinyl acetate, aromatic monomers, vinyl neodecanoate, and combinations thereof. The pre-emulsion is polymerized by combining the pre-emulsion with a radical initiator in a reactor to form a reaction mixture that polymerizes to form an emulsion polymer. This procedure implements novel and easily polymerizable benzophenone (meth)acrylates) into the polymer backbone preventing them from leaching out of finished coatings. Advantageously, the benzophenone-containing emulsions can be used to form paint coatings with dirt pick-up resistance while maintaining the excellent flexibility of paint finishes to limit cracking of the final film.

14 Claims, 2 Drawing Sheets

(51) Int. Cl.
*C08F 220/18* (2006.01)
*C08F 220/34* (2006.01)
*C09D 5/00* (2006.01)
*C09D 133/08* (2006.01)
*C09D 133/12* (2006.01)
*C09D 133/14* (2006.01)

(52) U.S. Cl.
CPC ........ *C08F 220/343* (2020.02); *C09D 133/08* (2013.01); *C09D 133/12* (2013.01); *C09D 133/14* (2013.01)

(58) Field of Classification Search
USPC .......................................................... 524/555
See application file for complete search history.

(56) References Cited

U.S. PATENT DOCUMENTS

| | | | |
|---|---|---|---|
| 9,120,936 | B2 | 9/2015 | Hibben et al. |
| 9,822,275 | B2 | 11/2017 | Hibben et al. |
| 10,301,399 | B2 | 5/2019 | Share |
| 2009/0318617 | A1* | 12/2009 | Dyllick-Brenzinger ..................... C08F 220/14 524/740 |
| 2011/0184095 | A1* | 7/2011 | Tom .................... C09B 67/0097 524/556 |
| 2012/0053260 | A1 | 3/2012 | Balk et al. |
| 2018/0016364 | A1* | 1/2018 | Share ........................ C08F 2/50 |
| 2019/0329211 | A1* | 10/2019 | Lu ............................. A61K 8/37 |
| 2020/0048474 | A1* | 2/2020 | Yang ....................... C08L 33/08 |

FOREIGN PATENT DOCUMENTS

| | | | |
|---|---|---|---|
| EP | 2371913 A1 | | 10/2011 |
| JP | 2001115082 A | * | 4/2001 |
| JP | 2001115082 A | | 4/2001 |
| WO | 2014149756 A1 | | 9/2014 |
| WO | 2016111923 A1 | | 7/2016 |
| WO | 2017017128 A1 | | 2/2017 |
| WO | 2018/176443 A1 | | 10/2018 |
| WO | 2021/000218 A1 | | 1/2021 |

OTHER PUBLICATIONS

Min, L. et al., "Research on the Side Reaction Control of Hydrosilylation Reaction of Polyether Modified Polysiloxane," Shanghai Coatings (2013), v. 51, n. 9, 4 pgs. (English Abstract included).
Office Action dated Jan. 6, 2024 for Chinese Appn. No. 202180059705.9 filed Jan. 19, 2023, 11 pgs (no English translation).

* cited by examiner

DIRT PICK UP RESISTANT LATEX RESIN

TECHNICAL FIELD

In at least one aspect, the present invention is related to paint composition that forms coatings with improved dirt pick up resistance and cracking resistance.

BACKGROUND

Any discussion of the prior art throughout the specification should in no way be considered as an admission that such prior art is widely known or forms part of common general knowledge in the field.

The surface characteristics of a substrate can be altered by a variety of means. For example, the water permeability, dirt adherence resistance, cracking resistance, wettability, and clarity properties of materials can be modified by suitable treatment of their surface. A number of compositions for altering the surface properties of substrates have been developed. Water repellant, oil repellent, stain-resistant, anti-microbial, anti-static, anti-fog, anti-scratch, and water absorptive surface treatments and coatings are well known commercial products.

Resistance to dirt adherence and cracking resistance is an important feature in coatings made from paint compositions. The latex polymers designed for exterior architectural coatings are getting softer due to VOC reduction, low volatile and zero VOC coalescent agent application, and flexibility required for dimensionally unstable substrates, such as wood. The softness of the latex binders leads to poor dirt pick up resistance of paint finishes, especially under hot weathering conditions. Higher $T_g$ binders lead to poor flexibility and cracking resistance on wood substrates, especially under cold temperatures.

Accordingly, there is a need for improved paint compositions that form coatings with resistance to dirt adherence.

SUMMARY

In at least one aspect, a method for forming a benzophenone-containing emulsion is provided. The method includes a step of forming a pre-emulsion by combining a monomer composition with a benzophenone or a benzophenone derivative in water, the monomer composition including one or more monomers selected from the group consisting of (meth)acrylic acid monomers and (meth)acrylic monomers, and combinations thereof. The pre-emulsion is polymerized by combining the pre-emulsion with a radical initiator in a reactor to form a reaction mixture that polymerizes to form an emulsion polymer. Advantageously, the benzophenone-containing emulsion can be used to form paint coatings with dirt pickup resistance while maintaining the excellent flexibility of paint finishes.

In another aspect, a new method for reacting a benzophenone into a polymer is described, where two reactive agents (one on the benzophenone and one on a polymerizable compound) are combined to prevent benzophenone from escaping from the coating.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
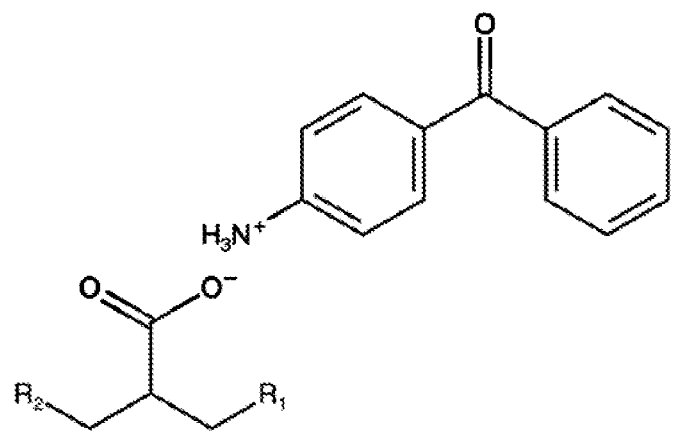
FIG. 1. A salt created from the interaction between an ionic polymer residue, such as methacrylic acid, and another complementarily charged benzophenone containing group, such as 4-aminobenzophenone.

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material and/or reaction conditions are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-OM^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; single letters (e.g., "n" or "o") represent integers such as 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary.

Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "emulsion polymer" or "emulsion" or "latex" or "binder" as used herein refers to a colloidal dispersion of discrete polymer particles in a liquid such as water. Sometimes herein, the term "emulsion polymer" or "emulsion" is referred to as a "resin."

The term "one or more" means "at least one" and the term "at least one" means "one or more." The terms "one or more" and "at least one" include "plurality" as a subset.

Throughout this application, where publications are referenced, the disclosures of these publications in their entireties are hereby incorporated by reference into this application to more fully describe the state of the art to which this invention pertains.

Abbreviations:

"VOC" means volatile organic compound.
"BP" means benzophenone or diphenyl ketone
"4HBP" means 4-hydroxy benzophenone
"GMA" means glycidyl methacrylate
"DPUR" means dirt pick-up resistance
"WBYP" means weathered beveled yellow pine
"YP" means yellow pine
"UV" means ultraviolet light
"$T_g$" means glass transition temperature In an embodiment, a method for forming a benzophenone-containing emulsion is provided. The method includes a step of forming a pre-emulsion by combining, in water, a monomer composition and benzophenone or a benzophenone derivative. The monomer composition includes one or more liquid monomers selected from the group consisting of (meth)acrylic acid monomers and (meth)acrylic monomers, styrene monomers, vinyl acetate monomers, vinyl ester monomers and combinations thereof. Characteristically, the monomers are liquids at 25° C. The pre-emulsion is then polymerized by combining the pre-emulsion with a radical initiator in a reactor to form a reaction mixture that polymerizes to an emulsion polymer. Advantageously, the benzophenone-containing emulsion provides dirt pick-up resistance and cracking resistance in finished coatings formed from paint composition that include the benzophenone-containing emulsion.

In a variation, the benzophenone derivative includes reactive functional groups such that the benzophenone derivative is copolymerized with one or more monomers. Examples of such reactive groups include but are not limited to amino, hydroxyl, epoxy, carbonyl, vinyl, or acrylate groups.

In a variation, the benzophenone derivative is described by formula 1:

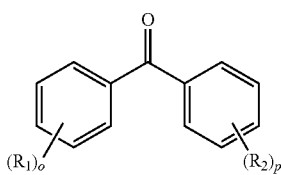

(1)

wherein:

o is 0, 1, 2, 3, 4, or 5;

p is 0, 1, 2, 3, 4, or 5 where o+p is 0 to 10

$R_1$, $R_2$ are each independently $C_{1-10}$ alkyl, $C_{6-14}$ aryl, $C_{6-15}$ heteroaryl, —$NH_2$, OH, —$R_3$—OH (i.e., an alcohol group), —$R_3$—$NH_2$, (e.g., an amino group), epoxy group, carbonyl group, vinyl group, or acylate group; and $R_3$ is a $C_{1-10}$ alkenylene group. In a refinement, $R_1$, $R_2$ are each independently phenyl, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, or allenyl groups. It should be appreciated that the $R_1$ on different carbon atoms of the same molecule need not be the same. Examples of suitable benzophenone derivative having formula 1 include, but are not limited to the following compounds:

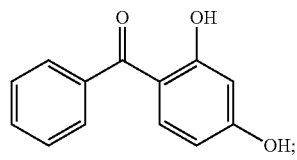

2,4-dihydroxy benzophenone

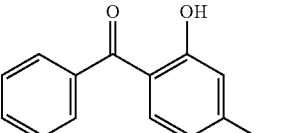

Sulisobenzone sodium

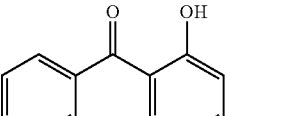

Oxybenzone

-continued

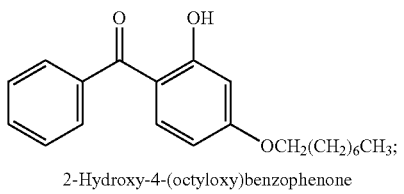

2-Hydroxy-4-(octyloxy)benzophenone

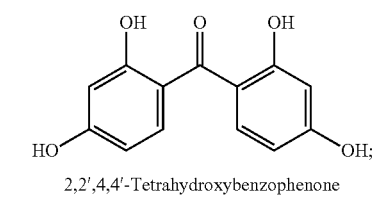

2,2',4,4'-Tetrahydroxybenzophenone

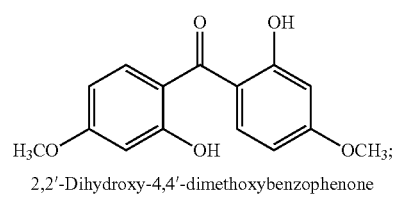

2,2'-Dihydroxy-4,4'-dimethoxybenzophenone

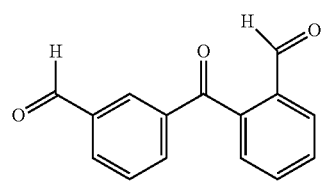

2-(3-Formylbenzoyl)benzaldehyde

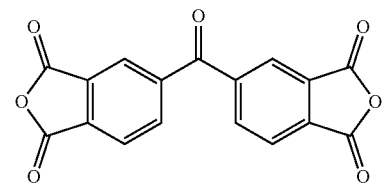

4,4'-Carbonyldipthalic anhydride

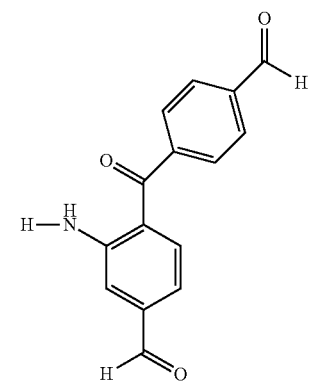

3-Amino-4-(4-formylbenzoyl)benzaldehyde

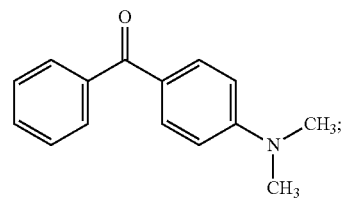

4-(Dimethylamino)benzophenone

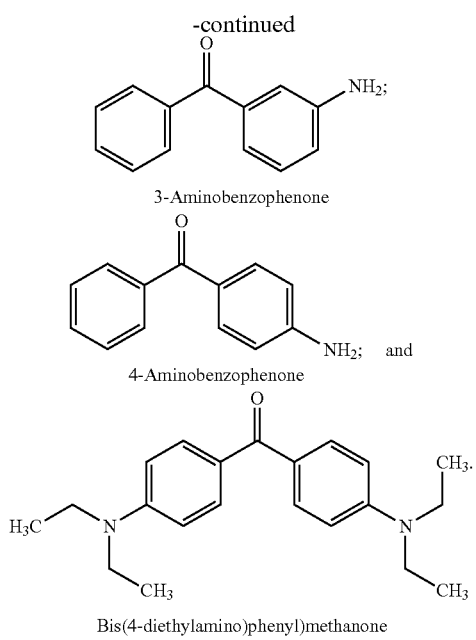

3-Aminobenzophenone

4-Aminobenzophenone and

Bis(4-diethylamino)phenyl)methanone

In another variation, the benzophenone derivative is described by formulae 2 or 3:

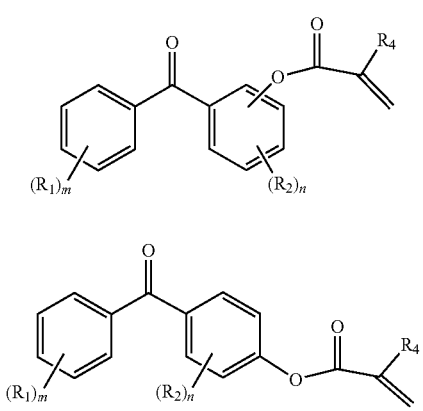

wherein:
m is 0, 1, 2, 3, 4, or 5;
n is 0, 1, 2, 3, or 4;
$R_1$, $R_2$ are each independently $C_{1-10}$ alkyl, $C_{6-14}$ aryl, $C_{6-15}$ heteroaryl, —OH, —$NH_2$, —$R_3$—OH, —$R_3$—$NH_2$, epoxy group, carbonyl group, vinyl group, or acylate group; and
$R_3$ is a $C_{1-10}$ alkenylene group. In a refinement, $R_1$, $R_2$ are each independently phenyl, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, or allenyl groups. It should be appreciated that the $R_2$ on different carbon atoms of the same molecule need not be the same.
$R_4$ is $C_{1-10}$ alkyl. In a refinement, $R_4$, is phenyl, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, or allenyl groups. It should be appreciated that $R_3$ on different carbon atoms of the same molecule need not be the same. Examples of suitable benzophenone derivatives having formula 2 or 3 includes, but are not limited to the following compounds:

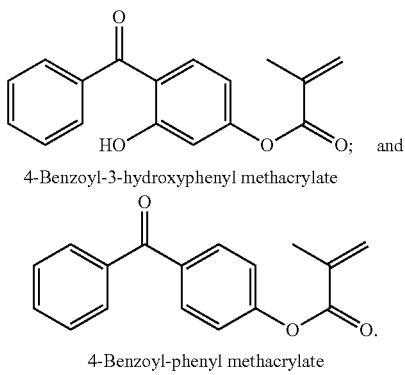

4-Benzoyl-3-hydroxyphenyl methacrylate and

4-Benzoyl-phenyl methacrylate

The scope of the present embodiment includes, but is not limited to, diphenyl carbonyl (benzophenone), derivatives, including symmetrically and asymmetrically substituted benzophenones. The groups that can be substituted on the rings include, but are not limited to, acrylates, sulfates, alcohols, anhydrides, ethers, including ethoxy and methoxy groups, aldehydes, halogens, benzoyl, acetates, phenyl groups, and branched, unbranched, saturated, unsaturated, or otherwise substituted hydrocarbon chains. Additionally, the phenyl group does not necessarily have to be closely attached to the carbonyl group, rather, there can be other molecules between the phenyl group and the carbonyl. Furthermore, while diphenyl carbonyls have been observed to be more effective, the number of phenyl groups can be more or less than two while maintaining the properties described herein.

Benzophenone and its derivative products are normally not water soluble and they cannot be used in waterborne paints directly. In this regard, solvents have been used to dissolve benzophenone and its derivative products before applying them into latex polymers or paints. These solvents introduce extra cost and often qualify as VOC's, which limit their use in paint applications. Furthermore, non-VOC solvents tend to negatively affect paint properties, while still incurring costs which have to be accounted for. One distinction of this embodiment is the use of the diphenyl carbonyls in the monomer emulsion. The organic monomers in latex resins play a solvent role to make the diphenyl carbonyls dissolve in the monomer emulsion. Additionally, some of the benzophenone products used in this innovation are polymerizable, which allows the diphenyl ketones to be copolymerized with the other latex monomers, preventing them from leaching out of the paint film.

These diphenyl carbonyls can be incorporated into a coating in a number of ways which are described throughout the present disclosure. Generally, these compounds are solids with high boiling points and low solubility in water, making it impossible to use them in waterborne paints directly. Additionally, the few products supplied in liquid form have low solubility in water and can cause latex instability issues when incorporated into polymers and paints. In one aspect, this barrier is overcome by solubilizing these compounds into the monomer pre-emulsion, which simultaneously overcomes the issues with solubility and the use of solvents. In another aspect, a similar method is used, which allows for the polymerization of these diphenyl ketones through either commercially available monomer diphenyl ketones, or the creation of polymerizable diphenyl ketones as part of the resin synthesis.

The polymerization of these compounds also provides an advantage by tying the diphenyl ketones into the paint film. Generally, these small molecules are able to escape the paint film if they do not react into the polymer backbone. This can cause the paint film to gain a chalky appearance, and lose some of the benefit of the diphenyl ketones, due to the lower concentration in the film. This can increase cost.

These methods are summarized as follows. The first method uses reactive monomers to dissolve the diphenyl carbonyls. The mixtures are emulsified in the monomer micelles to form a uniform reactive emulsion solution. The reactive monomers will initially act as a solvent, which will then polymerize to create a latex polymer without the addition of unnecessary solvent. This will also keep the benzophenone products emulsified and evenly distributed in the latex polymer.

Another method describes the use of diphenyl ketones such as Visiomer® 6976 or benzophenone methacrylate with a structure of formula 2 or 3, which are able to copolymerize with other monomers and react the benzophenone derivatives into the polymer backbone.

A further method uses acidic monomers, such as methacrylic acid, acrylic acid, styrene sulfonic acid, 2-acrylamido-2-methyl-1-pro-panesulfonic acid, and Solvay Sipomer® PAM adhesion promoters, to interact and possibly bond with charged benzophenones, such as amino or hydroxyl groups. This can form salts and enhance the solubility in water-based monomer pre-emulsions, as shown in FIG. 1.

Figure 2:
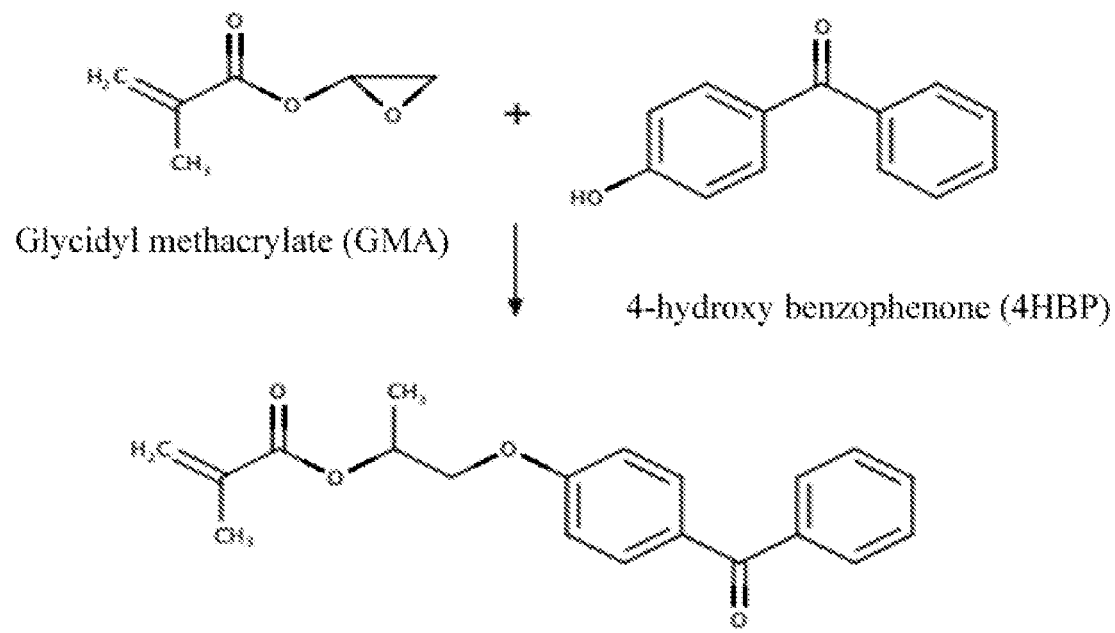
FIG. 2. A reaction between glycidyl methacrylate and 4-hydroxy benzophenone to create a polymerizable benzophenone methacrylate.

Another interaction describes the reaction between polymerizable compounds, such as those containing one or more acrylate or vinyl moieties, and the functional groups often found on diphenyl ketones. These two compounds can react to form new polymerizable benzophenone monomers, which allows the benzophenone to react and promote solubility of the compounds in the monomer emulsion. These compounds can then be copolymerized with other monomers and become incorporated into the backbone of latex polymers. For example, a potential reaction mechanism can be seen between glycidyl methacrylate and either hydroxyl or amino benzophenone derivatives to create a polymerizable benzophenone methacrylate, which can then copolymerize in an acrylic latex emulsion easily (see FIG. 2). This reaction helps prevent the cost and regulatory issues associated with currently sold benzophenone methacrylates by using compounds already familiar in the art of emulsion polymerization. Additionally, this technology uses currently produced materials which are well understood, well regulated, and easily commercially scalable.

Figure 3:
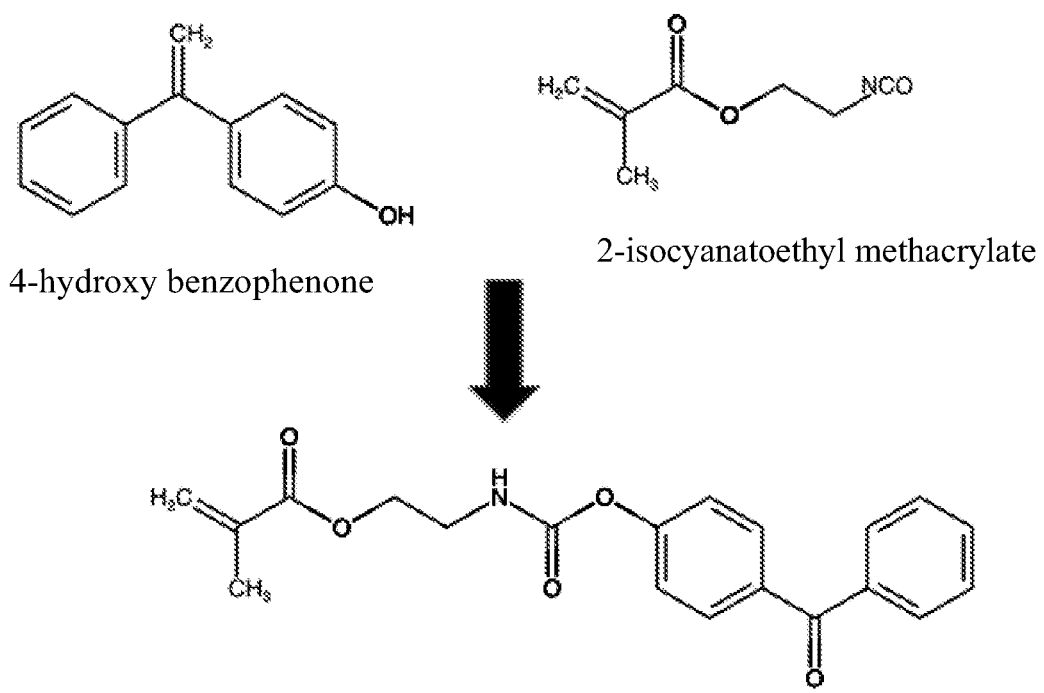
FIG. 3. A reaction between a functional monomer isocyanate and a complementary benzophenone group, in this case a hydroxyl group, to form a polymerizable benzophenone methacrylate.

Another example of a method to form a new polymerizable benzophenone is by the reaction of an isocyanate monomer, such as 2-isocyanatoethyl methacrylate, with benzophenones containing hydroxyl groups, amino groups or other reactive species, as seen in FIG. 3.

It should be appreciated that the use of the monomers set forth herein to prevent cracking is unknown. Moreover, many solvents that have been used to dissolve benzophenone derivatives are VOC's, which are not environmentally friendly and can lead to application issues. These properties of the solvents used herein highlight the features that make the disclosed process unique. By utilizing monomers as the solvent to dissolve diphenyl ketones, one does not have to make any consolations in cost, processing, or performance. The diphenyl ketones can be incorporated completely with elements already used in the majority of waterborne polymers. Furthermore, by using polymerizable components, one can prevent the migration of diphenyl ketones out of the coating, which suspects health concerns for interior use, and guarantees their availability in the polymer.

In one variation, the step of polymerizing the pre-emulsion includes a seeding step in which a portion of the pre-emulsion and a predetermined amount of initiator are added to the reaction mixture and allowed to react for a first predetermined time period at a first predetermined temperature. In a refinement, the first predetermined time period is from about 5 minutes to 2 hours and the first predetermined temperature from about 70° C. to about 100° C. In this variation, an additional amount of the pre-emulsion and the radical initiator is added to the reaction mixture over a second predetermined time period at a second predetermined temperature with mixing. In a refinement, the second predetermined time period is from about 1 hour to 10 hours, and the second predetermined temperature from about 70° C. to about 100° C. A chaser is then added to the reaction mixture at a third predetermined temperature over a third predetermined time period with mixing. The polymerization is allowed to complete over the third predetermined time period if desired, although the polymer is still generally viable for use after the second time period. The chasers can potentially scavenge any unreacted monomer, limiting the amount of VOC's released from the coating. In a refinement, the third period of time is from about 2 minutes to 2 hours and the third temperature from about 40° C. to about 70° C. After the mixture is allowed to cool (typically to room temperature), a neutralizing agent (e.g., ammonia) and optional additional additives can be added to the reaction mixture.

A "final emulsion composition" as used herein refers to a composition that includes all of the components that have been added to the reaction mixture including the neutralizing agent and any additives set forth herein. In a variation, in the final emulsion composition, the monomer composition is present in an amount from about 25 to 65 weight percent of the final emulsion composition, benzophenone and/or the benzophenone derivative is present in an amount from about 0.05 to 15 weight percent of the total weight of the final emulsion composition, and the radical initiator is present in an amount from about 0.05 to 2 weight percent of the total weight of the final emulsion composition with the balance being water. In a refinement, the chaser is present in an amount from about 0.05 to 2 weight percent of the total weight of the final emulsion composition. In a further refinement, the neutralizer is present in an amount of about 0.05 to 5 weight percent of the total weight of the final emulsion composition. In a further refinement, the biocide is present in an amount of 0.01-0.40 percent of the total weight of the final siloxane-containing resin emulsion.

Although the present invention does not depend on any particular theory of operation, it is believed that benzophenone and its derivatives improve the hardness of the top layer of paint finishes when exposed to UV light and thus the paint film displays better dirt pick-up resistance. This is because these additives are photoinitiators and make the polymer crosslink under sunlight. Benzophenone and its derivatives are normally not water-soluble and thus cannot generally be used in waterborne paints directly. In the present embodiment, benzophenone or benzophenone derivatives are added to the monomer emulsion. The organic monomers in latex resins play a solvent role to make the additives dissolve in the monomer emulsion. Additionally, one of the benzophenone products used in this innovation is a monomer form, and it will be copolymerized with monomers, which will prevent it from leaching out of paint films.

As set forth above, the emulsion polymerization is initiated by radical initiators that generate free radicals upon exposure to heat or light to initiate polymerization. The radical initiator can be a water-soluble initiator or an oil-soluble initiator. Water-soluble initiators are preferred in this instance. Suitable water-soluble radical initiators include, but are not limited to, persulfates (e.g., potassium persulfate, ammonium persulfate, sodium persulfate, and mixtures thereof), oxidation-reduction initiators, and combinations thereof. The oxidation-reduction initiator can be the reaction product of persulfates (e.g., potassium persulfate, ammonium persulfate, sodium persulfate, and mixtures thereof) and reducing agents. Examples of reducing agents include sodium metabisulfite and sodium bisulfite; and 4,4'-azobis (4-cyanopentanoic acid) and its soluble salts (e.g., sodium, potassium). Suitable oil-soluble radical initiators include, but are not limited to, azo-compounds such as 2,2'-azobis (isobutyronitrile)) and 2,2'-azobis(2,4-dimethylpentanenitrile. Additional radical initiators can be organic peroxides, metal iodides, and metal alkyls, and combinations thereof. Moreover, the radical initiators set forth herein can also be used for the chaser. It should be appreciated that each of the combinations of the initiators set forth above can also be used.

As set forth above, the monomers include (meth)acrylic acid monomers, (meth)acrylic monomers, vinyl acetate, aromatic monomers, vinyl neodecanoate monomers, and combinations thereof. The (meth)acrylic acid monomers include acrylic acid, methacrylic acid and substituted derivatives thereof. Examples of the (meth)acrylic monomers include, but are not limited to, methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof. In a refinement, the monomer composition includes butyl acrylate, ethyl hexyl acrylate, methyl methacrylate, acrylic acid, and methacrylic acid.

In another embodiment, an acrylic emulsion formed by the methods set forth above is provided. The acrylic emulsion includes water, an acrylic polymer or copolymer, and benzophenone and/or the benzophenone derivative(s). Typically, benzophenone and/or the benzophenone derivative is present in an amount from 0.05% to 15% of the weight of the first acrylic polymer or copolymer. Characteristically, the acrylic polymer or copolymer is formed by polymerizing the monomer compositions set forth above. Consistent with the methods set forth above, the emulsion can include adhesion promoter(s), the defoamer, the biocide, the initiator, the chaser, the neutralizing agent, and residues or byproducts of each of these components. Details of the benzophenone, benzophenone derivatives and all other potential components of the acrylic emulsion are the same as set forth above.

In a variation, the acrylic polymer or copolymer is present in an amount from about 25 to 65 weight percent of the acrylic emulsion, the benzophenone and/or the benzophenone and/or the benzophenone derivative is present in an amount from about 0.05 to 15 weight percent of the total weight of the acrylic emulsion, and the radical initiator or residue thereof is present in an amount from about 0.05 to 2 weight percent of the total weight of the acrylic emulsion with the balance being water. In a refinement, the chaser or residue thereof is present in an amount from about 0.05 to 2 weight percent of the total weight of the acrylic emulsion. In a further refinement, the biocide or residue thereof is present in an amount from about 0.01 to 0.40 percent of the total weight of the acrylic emulsion and/or defoamer or residue thereof is present in an amount from about 0.002 to 2 weight percent of the total weight of the acrylic emulsion and/or the adhesion promoter or residue thereof is present in an amount from about 0.5 to about 5 weight percent of the total weight of the acrylic emulsion.

In another embodiment, a paint composition that includes the benzophenone and/or the benzophenone derivative set forth above is provided. In addition to the benzophenone-containing resin, the paint composition can optionally include a pigment composition. In a refinement, the pigment composition is a solvent based acrylic-based colorant. In another refinement, the pigment compositions include a dye or pigment in a solvent based system.

It should be appreciated that when the paint composition is applied to a substrate, it is necessary for the coated substrate to be exposed to light so as to complete the curing by providing crosslinking of the polymers or copolymers therein.

In a variation, the paint compositions set forth herein include a mildewcide. Typically, the mildewcide is present in an amount from about 0.1 to 4 weight percent of the total weight of the paint composition. In a refinement, the mildewcide is present in an amount from about 1 to 3 weight percent of the total weight of the paint composition. In another refinement, the mildewcide is present in an amount from about 1.5 to 2.5 weight percent of the total weight of the paint composition. An example of a useful mildewcide is 3-iodo-2-propynyl butylcarbamate ("IPBC").

In typical applications, the paint composition can include one or more additives in relatively low amounts in order to provide important properties to the paint composition. Typical additives include rheology modifiers, surfactants, suspending agents, defoamers, organic solvents, dispersants, coalescents, light stabilizers (e.g., hindered amine light stabilizer such as Tinuvin 292), biocides and combinations thereof. In a variation, the additives are collectively present in an amount from about 0.1 to 10 weight percent. In a refinement, the additives are collectively present in an amount from about 1 to 5 weight percent. It should be appreciated that other well-known additives can be utilized to provide additional properties. In a refinement, each of the following additives is independently optionally present in an amount greater than 0.01, 0.05, 1.0, 2.0, 3.0 or 4.0 weight present of the total weight of the paint composition and in an amount less than, 20.0, 15.0, 10.0, 9.0, 8.0, 7.0, or 6.0 weight present of the total weight of the paint composition: rheology modifiers, surfactants, defoamers, organic solvents, dispersants, coalescents, light stabilizers, and biocides.

In a variation, the paint composition set forth above is made by a two-step process—the mill and the letdown. In the mill step, the solvent (water), dispersant, defoamer, and pigments are mixed together with large shear forces. In the letdown step, the benzophenone-containing resin, the mildewcide, if present, the rheology modifier, if present, and the biocide, if present, are added to the grind product.

The following examples illustrate the various embodiments of the present invention. Those skilled in the art will recognize many variations that are within the spirit of the present invention and scope of the claims.

Example 1

Table 1 provides the compositions for a conventional latex formula without diphenyl ketone additives.

TABLE 1

| Latex polymer 1. |
| --- |
| Reactor Charge |
| 170 g Water<br>3 g Solvay Rhodacal ® A246 MBA<br>1 g Sodium Carbonate |
| Pre-emulsion |
| 180 g Water<br>3 g Solvay Rhodacal ® A246 MBA<br>1 g Sodium Carbonate<br>265 g Butyl Acrylate<br>185 g Methyl Methacrylate<br>20 g Ureido Methacrylate (50% in water) |
| Initiator |
| 50 g Water<br>1 g Sodium Persulfate |
| Chaser |
| 20 g Water<br>2 g t-Butyl Hydroperoxide |
| Chaser |
| 20 g Water<br>2 g Bruggolite ® FF6M |
| Neutralizer |
| 2 g Ammonia solution (17%) |
| Biocide |
| 2 g Acticide MBS 2550 |

This latex is formed as follows: Add all components of reactor charge to a sealed reactor kettle flushed with nitrogen and make them mix well. To prepare pre-emulsion, mix water, surfactant, and sodium carbonate at 150 rpm for 10 minutes until everything is dissolved and homogenous. Turn the mixer speed up to 500 rpm and add the remaining pre-emulsion components. Once all components have been added, stir pre-emulsion for 30 minutes to ensure stable emulsification. Prepare initiator by dissolving persulfate in water, and load into syringe pump connected to reactor. Heat reactor charge to 80° C. while stirring and then feed in 5% pre-emulsion. Wait for the kettle to reach 80° C. again and then add 5% initiator solution to obtain latex seeds. Allow reactor to exotherm, and fully react ~15 minutes or until the temperature stabilizes after the exotherm. Increase temperature to 85° C. Feed pre-emulsion at a steady rate over 4 hours while simultaneously feeding in initiator over 4.5 hours. After feeding, hold the reactor at temperature for 30 minutes and then cool reactor to 45-55° C. Dissolve chaser feeds separately into water and load into separate syringes. Add syringes to a syringe pump connected to the reactor. Feed chaser solutions simultaneously into the reactor for 20 minutes at 45-55° C. Hold reaction at temperature for 20 minutes after the chaser solution feeding. Cool to room temperature and add neutralizer and biocide. Filter the latex, using a 150 micron filter, into a container for storage.

Example 2

Table 2 provides the compositions for a latex formula with diphenyl ketone additives.

TABLE 2

| Latex polymer 2. |
| --- |
| Reactor Charge |
| 170 g Water<br>3 g Solvay Rhodacal ® A246 MBA<br>1 g Sodium Carbonate |
| Diphenyl ketone solution |
| 10 g Diphenyl Ketone<br>225 g Methyl Methacrylate |
| Pre-emulsion |
| 180 g Water<br>3 g Solvay Rhodacal ® A246 MBA<br>1 g Sodium Carbonate<br>225 g Butyl Acrylate<br>20 g Ureido Methacrylate (50% in water) |
| Initiator |
| 50 g Water<br>1 g Sodium Persulfate |
| Chaser |
| 20 g Water<br>2 g t-Butyl Hydroperoxide |
| Chaser |
| 20 g Water<br>2 g Bruggolite ® FF6M |
| Neutralizer |
| 2 g Ammonia solution (17%) |
| Biocide |
| 2 g Acticide MBS 2550 |

Based on Latex 1 recipe, this latex was designed with diphenyl ketone. This latex is formed as follows: 100% diphenyl ketone in solid form was dissolved with methyl methacrylate monomer in the resin recipe. Then, the preemulsion is made similarly to step one, with the methyl methacrylate and diphenyl ketone mixture being added in where the methyl methacrylate was added into the pre emulsion. Methyl methacrylate and butyl acrylate were adjusted to a similar glass transition temperature ($T_g$) as Latex 1. Past this, the reaction conditions are identical to that described for Example Latex 1.

Example 3

Table 3 provides the compositions for a conventional latex formula without diphenyl ketone additives.

TABLE 3

| Latex polymer 3. |
| --- |
| Reactor Charge |
| 170 g Water<br>3 g Solvay Rhodacal ® A246 MBA<br>1 g Sodium Carbonate |
| Pre-emulsion |
| 180 g Water<br>3 g Solvay Rhodacal ® A246 MBA<br>1 g Sodium Carbonate |

TABLE 3-continued

Latex polymer 3.

225 g Butyl Acrylate
225 g Methyl Methacrylate
20 g Ureido Methacrylate (50% in water)
Initiator 50 g Water
1 g Sodium Persulfate
Chaser 20 g Water
2 g t-Butyl Hydroperoxide
Chaser 20 g Water
2 g Bruggolite ® FF6M
Neutralizer 2 g Ammonia solution (17%)
Biocide 2 g Acticide MBS 2550

The main difference between this resin and Latex polymer 1 is that Latex 3 is softer due to the higher level of the soft butyl acrylate monomer. The reaction conditions are identical to that described for Latex 1.

Example 4

Table 4 provide the compositions for a latex formula with polymerizable diphenyl ketone made on site.

TABLE 4

Latex polymer 4.

Reactor Charge 170 g Water
3 g Solvay Rhodacal ® A246 MBA
1 g Sodium Carbonate
Diphenyl Ketone Functionalization 10 g 4-hydroxy benzophenone
10 g Glycidyl methacrylate
Pre-emulsion 180 g Water
3 g Solvay Rhodacal ® A246 MBA
1 g Sodium Carbonate
225 g Butyl Acrylate
225 g Methyl Methacrylate
10 g Ureido Methacrylate (50% in water)
Initiator 50 g Water
1 g Sodium Persulfate
Chaser 20 g Water
2 g t-Butyl Hydroperoxide
Chaser 20 g Water
2 g Bruggolite ® FF6M
Neutralizer 2 g Ammonia solution (17%)
Biocide 2 g Acticide MBS 2550

This latex is formed as follows: Mix 10 g of 4-hydroxy benzophenone and 10 g of glycidyl methacrylate overnight at a moderate speed to obtain diphenyl ketone functionalized with a methacrylate group. Make the preemulsion as described in Example Latex 1, and add this solution to the pre-emulsion after all other monomers have been added; mix to emulsify with all other monomers. Other components of this latex polymer are the same as Latex polymer 3. The reaction conditions are identical to that described for Example Latex 1.

Example 5

Table 5 provides compositions for a latex formula with polymerizable diphenyl ketone

TABLE 5

Latex polymer 5.

Reactor Charge 170 g Water
3 g Solvay Rhodacal ® A246 MBA
1 g Sodium Carbonate
Pre-emulsion 180 g Water
3 g Solvay Rhodacal ® A246 MBA
1 g Sodium Carbonate
265 g Butyl Acrylate
185 g Methyl Methacrylate
10 g Ureido Methacrylate (50% in water)
1.5 g Evonik Visiomer ® 6976
Initiator 50 g Water
1 g Sodium Persulfate
Chaser 20 g Water
2 g t-Butyl Hydroperoxide
Chaser 20 g Water
2 g Bruggolite ® FF6M
Neutralizer 2 g Ammonia solution (17%)
Biocide 2 g Acticide MBS 2550

Compared to Latex polymer 1, Latex 5 has 1.5 g of Evonik Visiomer® 6976 added, a commercially available polymerizable diphenyl ketone. The reaction conditions are identical to that described for Latex 1

Example 6

Table 6 provides compositions for a latex formula with polymerizable diphenyl ketone.

TABLE 6

Latex polymer 6.

Reactor Charge 170 g Water
3 g Solvay Rhodacal ® A246 MBA
1 g Sodium Carbonate
Pre-emulsion 180 g Water
3 g Solvay Rhodacal ® A246 MBA
1 g Sodium Carbonate
265 g Butyl Acrylate

TABLE 6-continued

Latex polymer 6.

185 g Methyl Methacrylate
20 g Ureido Methacrylate (50% in water)
3 g Evonik Visiomer® 6976
Initiator 50 g Water
1 g Sodium Persulfate
Chaser 20 g Water
2 g t-Butyl Hydroperoxide
Chaser 20 g Water
2 g Bruggolite® FF6M
Neutralizer 2 g Ammonia solution (17%)
Biocide 2 g Acticide MBS 2550

Compared to Latex 5, the Evonik Visiomer® 6976 level was doubled in Latex 6. The reaction conditions are identical to that described for Latex 1.

Performance Results

The performance of the above latexes were evaluated in both clear and pigmented coatings.

As clear coatings, latex resin samples were cast on Leneta® Black Release Charts using a 3 mil latex film caster, then dried for 3 days under ambient conditions. The sample charts were put into a UV lamp cabinet chamber for 48 hours. These samples were then removed from the charts using a box cutter, and their glass transition ($T_g$) was measured using a Differential Scanning Calorimeter, in order to determine how hard the film was before and after UV exposure.

Table 7 shows the glass transition temperature changes of different polymers. Glass transition temperature is an indication of polymer hardness and crosslinking, which is determined from the heat capacity of the polymer. The glass transition temperature is generally understood to be the temperature at which the polymer transitions between a tacky or soft state and a glassy or hard state. Two conclusions can be obtained from Table 7.

1) The $T_g$ of the latex polymer is reduced several degrees after diphenyl ketone products were added into the polymer. This means that the polymer became softer and more flexible, which can potentially help coalescence, promote flexibility, and prevent cracking.

2) The latex polymers with diphenyl ketone products had a more significant $T_g$ rise after UV exposure. This means that the polymers became harder with UV exposure and more crosslinking occurred. The former effect will make latex polymers have a lower film formation temperature and better flexibility, reducing the coalescing agent demand and overall paint VOC. It also enhances the cracking resistance of latex paints and improves the paint's weathering resistance and durability.

TABLE 7

Glass transition temperature (° C.) change of latex polymers after UV exposure

| Sample | BP or BP derivatives (Wt. %) | $T_g$ (° C.) (Before UV exposure) | $T_g$ (° C.) (After UV exposure) | $\Delta T_g$ (° C.) |
|---|---|---|---|---|
| Latex 1 | 0 | 6 | 12 | 6 |
| Latex 2 | 0.22 | 4 | 13.5 | 9.5 |
| Latex 3 | 0 | 19 | 23 | 4 |
| Latex 6 | 0.64 | 10.5 | 18 | 7.5 |

In the paint application, this hardness improvement is theorized to only happen on the very top layer of the paint film, which can reduce the tackiness of the paint film and decrease the dirt accumulation on the film while still maintaining the flexibility of the substrate side of the film.

These resins were further tested in architectural coatings from low sheen flat paints to higher sheen semi-gloss paints, in order to test a broad range of architectural coatings. White bases were used in order to better visualize the dirt accumulation of the film.

White Flat Paint Formula

This paint formula is formed as follows: Mix mill container at high shearing speed starting with water, then add each subsequent ingredient in order, allowing 5 minutes for mixing between ingredients. Following this, transfer ingredients to letdown container, and continue to add the rest of the ingredients in order while stirring. Stir for 20 minutes before removing paint. Let paint rest 30 minutes before testing.

TABLE 8

Compositions of White Base Flat Paint Formula

| Mill | |
|---|---|
| Water | 35 g |
| TiO$_2$ slurry with 76% solids | 290 g |
| Sodium Nitrite | 3 g |
| BYK Optiflo T1000 (ICI driver/rheology modifier) | 10 g |
| Dow Tamol ™ 2011 (dispersant) | 8 g |
| Dow Tamol ™ 165A (dispersant) | 1 g |
| BYK 024 ® (defoamer) | 2 g |
| Minex ® 4 (filler) | 70 g |
| Minex ® 3 (filler) | 30 g |
| Celite 281 (filler/matting agent) | 30 g |
| Zinc Omadine ® (zinc pyrithione dispersion) | 2 g |
| Water | 35 g |
| Letdown | |
| Resin | 300 g |
| BYK ® 024 (silicone defoamer) | 2 g |
| Ashland Natrosol ™ Plus 330 (cellulosic thickener) | 1 g |
| Ammonia 17% (neutralizer) | 3 g |
| Eastman Velate ™ 368 (coalescent) | 10 g |
| Proxel ® AQ (preservative) | 3.5 g |
| Dow Acrysol ™ RM-8W (HEUR rheology modifier) | 5 g |

Mix mill container at high speed with pigment grinding blade capable of high shearing. Starting with water, add each ingredient in the listed order for the Mill table, allowing 5 minutes to mix between ingredients, then 30 minutes at the end to fully disperse pigments. Following this, transfer ingredients to letdown container, and continue to add the rest of the ingredients in order while stirring. Stir for 20 minutes before removing paint from the letdown. Let sit 30 minutes before testing.

White Semi-Gloss Paint Formula

The formulation steps are similar to the above flat paint. The main difference is white semi-gloss paint formula uses less fillers and matting agents, while using more latex resin than white flat paint.

TABLE 9

Compositions of White Semi-Gloss Paint Formula

Mill

| | |
|---|---|
| TiO$_2$ slurry with 76% solids | 100 g |
| Water | 10 g |
| Ammonia 17% (neutralizer) | 2 g |
| Dow Tamol ™ 165A (dispersant) | 3 g |
| Dow Tamol ™ 2011 (dispersant) | 2 g |
| BYK 024 ® (silicone defoamer) | 2 g |
| Minex ®10 (filler) | 50 g |
| Zinc Omadine ® (zinc pyrithione dispersion) | 2 g |
| Water | 85 g |
| ZnO Slurry | 4 g |

Letdown

| | |
|---|---|
| TiO$_2$ slurry with 76% solids | 140 g |
| Ashland Aquaflow ™ NHS 310 ® (ICI driver/thickener) | 14 g |
| Resin | 450 g |
| BYK 024 ® (silicone defoamer) | 2 g |
| Dow Acrysol ™ RM-895 (HEUR rheology modifier) | 6 g |
| Eastman Velate ™ 368 (coalescent) | 15 g |
| Proxel ® AQ (preservative) | 3.5 g |
| Dow Acrysol ™ RM-8W ® (HEUR rheology modifier) | 7.5 g |

When testing the dirt pick-up resistance (DPUR), cracking resistance, and flexibility of paints, the paint samples are applied to a wooden substrate which can include but is not limited to yellow pine, cedar, plywood, or redwood. Additionally these panels are a uniform thickness, with the exception of the beveled panels, which are thick on one end, and come to a point on the other end. There are a variety of thicknesses under this substrate. This is thought to increase the amount of dimensional changes and, thus, accelerate the paint failure. Additionally, these wood panels can be weathered or unweathered, depending on the desired result. Weathering the panels, by leaving them outside for three months, makes the substrates less stable, and can easily cause cracking of the coatings. Ultimately, these different substrates allow for different degrees of variability, flexibility, and expansion of the substrate due to factors like heat, moisture, and freezing.

In the studies below, samples were applied with two coats of the desired paint sample.

They were then allowed to cure for one week indoors before being exposed outside on racks that were tilted at 45° south. After a given period of time, the latex polymer paints were examined visually and quantitatively. Cracking resistance and DPUR were rated from 1 (worst) to 10 (best) for performance comparison. The cracking resistance ranking was based on the density of coating cracks and peeling.

The DPUR rating was based on the dirt accumulation and darkness shown on the test panels,

TABLE 10

White semi-gloss paint panels exposed for 12 months on weathered beveled yellow pine (WBYP) and yellow pine (YP)

| | | DUUR Observation | | Cracking Resistance | |
|---|---|---|---|---|---|
| Latex polymer | Description | WBYP | YP | WBYP | YP |
| Latex 1 | No BP | 5 | 5 | 7.5 | 10 |
| Latex 2 | 0.22% BP | 9 | 8.5 | 9 | 10 |
| Latex 3 | No BP | 7 | 7 | 4 | 8 |
| Resin 4 | GMA and 4-HBP | 8.5 | 8.5 | 9 | 10 |
| Latex 5 | 0.32% Visiomer ® 6976 | 8 | 8 | 6 | 9 |
| Latex 6 | 0.64% Visiomer ® 6976 | 8.5 | 9 | 7.5 | 10 |
| Behr Exterior Ultra ® | Commercial | 6 | 7 | 3 | 8 |

TABLE 11

White flat paint panels exposed for 12 months on plywood and yellow pine (YP)

| | | DUUR Observation | | Cracking Resistance | |
|---|---|---|---|---|---|
| Latex polymer | Description | WBYP | YP | WBYP | YP |
| Latex 1 | No BP | 5 | 6.5 | 4 | 8 |
| Latex 2 | 0.22% BP | 8 | 9 | 7 | 10 |
| Latex 3 | No BP | 6 | 7.5 | 3.5 | 6.5 |
| Latex 4 | GMA and 4-HBP | 7 | 8 | 7 | 9.5 |
| Latex 5 | 0.32% Visiomer ® 6976 | 7.5 | 8 | 5 | 8 |
| Latex 6 | 0.64% Visiomer ® 6976 | 8 | 9 | 6.5 | 8.5 |
| Behr Exterior Ultra ® | Commercial | 6 | 7 | 6 | 9 |

The following conclusions can be drawn from Tables 10 and 11:

1. All paints formulated with latex resins containing BP or BP derivatives showed better cracking resistance and DPUR.
2. Latex samples 5 and 6 showed that the cracking resistance and DPUR were improved when the Visiomer® 6976 level was increased.
3. Table 1 showed that Latex polymer 6 was softer than Latex 3, however Latex polymer 6 showed better DPUR.
4. Table 1 showed Latex polymer 1 and 2 had similar $T_g$ values, but the latter had much better DPUR and cracking resistance in both flat and semi-gloss paints.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   a) dissolving a polymerizable benzophenone monomer in a reactive monomer composition to form a pre-emulsion, the polymerizable benzophenone monomer formed by reacting a diphenyl ketone having functional groups and a polymerizable component having one or more acrylate or vinyl moieties; and b) emulsifying the pre-emulsion by combining the pre-emulsion with a radical initiator in a reactor to form a reaction mixture that polymerizes to form an emulsion polymer, wherein the polymerizable benzophenone monomer is described by structure 2:

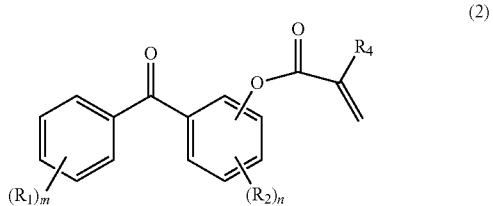

(2)

wherein:
m is 0, 1, 2, 3, 4, or 5;
n is 0, 1, 2, 3, or 4;
$R_1$, $R_2$ are each independently $C_{1-10}$ alkyl, $C_{6-14}$ aryl, $C_{6-15}$ heteroaryl, —OH, —NH$_2$, —R$_3$—OH, —R$_3$—NH$_2$, epoxy group, carbonyl group, vinyl group, or acylate group;
$R_3$ is a $C_{1-10}$ alkenylene group; and
$R_4$ is $C_{1-10}$ alkyl.

2. The method of claim 1 wherein the radical initiator is selected from the group consisting of organic peroxides, azo-compounds, metal iodides, metal alkyls, persulfates, and combinations thereof.

3. The method of claim 1 wherein the reactive monomer composition includes one or more monomers selected from the group consisting of acrylic acid, methacrylic acid, vinyl acetate, aromatic monomers, vinyl neodecanoate, and combinations thereof.

4. The method of claim 1 wherein the reactive monomer composition includes one or more monomers selected from the group consisting of methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof.

5. The method of claim 1 wherein the reactive monomer composition includes butyl acrylate, ethyl hexyl acrylate, methyl methacrylate, acrylic acid, and methacrylic acid.

6. The method of claim 1 wherein step b) includes a seeding step in which a portion of the pre-emulsion and a predetermined amount of initiator are added to the reaction mixture and allowed to react for a first predetermined time period at a first predetermined temperature.

7. The method of claim 6 wherein the first predetermined time period is from about 10 minutes to 2 hours and the first predetermined temperature is from about 70° C. to about 100° C.

8. The method of claim 6 wherein an additional amount of the pre-emulsion and the radical initiator is added to the reaction mixture over a second predetermined time period at a second predetermined temperature with mixing, the second predetermined time period being after the first predetermined time period.

9. The method of claim 8 wherein the second predetermined time period is from about 1 hour to 10 hours and the second predetermined temperature is from about 70° C. to about 100° C.

10. The method of claim 8 further comprising adding a neutralizing agent to the reaction mixture.

11. The method of claim 1 wherein a final emulsion composition is a composition that includes all of components that have been added to the reaction mixture such that the reactive monomer composition is present in an amount from about 25 to 65 weight percent of the final emulsion composition, the polymerizable benzophenone monomer is present in an amount from about 0.05 to 15 weight percent of the total weight of the final emulsion composition, and the radical initiator is present in an amount from about 0.05 to 2 weight percent of the total weight of the final emulsion composition with the balance being water.

12. A paint composition comprising the emulsion polymer made by the method of claim 1, the paint composition able to form a coating with dirt pick up resistance and cracking resistance.

13. The method of claim 1, wherein $R_1$, $R_2$ are each independently —OH, —NH$_2$, —R$_3$—OH, —R$_3$—NH$_2$ vinyl group, or acylate group.

14. The method of claim 1, wherein glycidyl methacrylate reacts with a hydroxyl or amino benzophenone derivative to form the polymerizable benzophenone monomer.

* * * * *